(12) United States Patent
Altoè et al.

(10) Patent No.: US 12,551,048 B2
(45) Date of Patent: Feb. 17, 2026

(54) DEVICE FOR EMULSIFYING AND/OR HEATING MILK AND METHOD FOR PRODUCING A MILK-BASED DRINK

(71) Applicant: DE' LONGHI APPLIANCES S.r.l., Treviso (IT)

(72) Inventors: Edy Altoè, Treviso (IT); Matteo Stecca, Treviso (IT); Alessandro Sartor, Treviso (IT); Stefano Forin, Treviso (IT); Giovanni Rossetto, Treviso (IT)

(73) Assignee: DE' LONGHI APPLIANCES S.r.l., Treviso (IT)

( * ) Notice: Subject to any disclaimer, the term of this patent is extended or adjusted under 35 U.S.C. 154(b) by 731 days.

(21) Appl. No.: 17/959,886

(22) Filed: Oct. 4, 2022

(65) Prior Publication Data

US 2023/0111068 A1    Apr. 13, 2023

(30) Foreign Application Priority Data

Oct. 4, 2021   (IT) .................. 102021000025424

(51) Int. Cl.
*A47J 31/44*   (2006.01)
(52) U.S. Cl.
CPC ....... *A47J 31/4489* (2013.01); *A47J 31/4485* (2013.01)
(58) Field of Classification Search
CPC .............. A47J 31/4485; A47J 31/4489; A47J 31/5251; A47J 31/5253; A23C 2210/30; B01F 23/235; B01F 2101/07; Y10S 261/16; Y10S 261/76

USPC ................. 99/293, 323.1, 453; 261/DIG. 16, 261/DIG. 76; 426/474
See application file for complete search history.

(56) References Cited

U.S. PATENT DOCUMENTS

| | | | |
|---|---|---|---|
| 4,620,953 A * | 11/1986 | Silla et al. .......... | A47J 31/4485 426/477 |
| 5,238,155 A | 8/1993 | Blake, III | |
| 6,006,654 A * | 12/1999 | Pugh .................... | A47J 31/4485 99/323.1 |
| 7,550,169 B2 * | 6/2009 | Green et al. ........ | A47J 31/4485 99/323.1 |
| 2019/0350403 A1 * | 11/2019 | Steiner ................ | A47J 31/4485 |
| 2021/0059466 A1 * | 3/2021 | Mueller .............. | A47J 31/4485 |
| 2024/0156298 A1 * | 5/2024 | Hugi et al. .......... | A47J 31/5253 |

FOREIGN PATENT DOCUMENTS

| | | | | |
|---|---|---|---|---|
| DE | 102017123642 A1 * | 4/2019 | .......... | A47J 31/4485 |
| EP | 2665396 B1 | 8/2015 | | |

* cited by examiner

*Primary Examiner* — Stephen F. Gerrity
(74) *Attorney, Agent, or Firm* — Troutman Pepper Locke LLP (57) ABSTRACT

A device for emulsifying and/or heating milk comprising a milk heater, a hermetically closed milk container, a mixer provided with a milk inlet, an air inlet and an outlet of a milk-based drink, a milk supply circuit comprising a connection conduit between the milk container and the milk inlet, and at least one air pump connected in delivery to a pressurization conduit of the milk container for pushing the pressurized milk towards the milk inlet, where a pressure adjustment means of said pressurization conduit is included which is used for adjusting the temperature of the milk.

16 Claims, 7 Drawing Sheets

DEVICE FOR EMULSIFYING AND/OR HEATING MILK AND METHOD FOR PRODUCING A MILK-BASED DRINK

CROSS REFERENCE TO RELATED APPLICATIONS

The present application claims priority to Italian Patent Application No. 102021000025424, filed on Oct. 4, 2021, the entire contents of which is incorporated by reference herein in its entirety.

FIELD OF THE INVENTION

The present invention relates to a device for emulsifying and/or heating milk adapted to produce milk-based drinks at various temperatures and degree of air emulsion.

BACKGROUND

Devices of this type are known to include a mixer which employs a flow of heating steam which sucks in an air-milk mixing chamber by Venturi effect. For the adjustment of the temperature and the degree of foam of the drink, the proportions of milk and air in the mixture can be changed by modifying the width of the milk inlet section and/or the air inlet section in the mixing chamber. For example, with the same steam flow and air inlet section, the greater the milk inlet section, the greater the flow of sucked milk and consequently the lower the temperature and the amount of foam of the milk-based drink.

Furthermore, the greater the air inlet section, the higher the degree of foam of the drink, always with the same steam flow and milk inlet section.

Obviously, the main drawback of this solution lies in the fact that the adjustment of the temperature has an undesirable effect on the adjustment of the degree of foam and vice versa.

On the other hand, if the milk and air inlet sections are not modified, but only the steam temperature is increased with the same flow thereof, a variation in the preparation time is simply achieved with the same temperature of the drink.

Mixing systems which do not exploit the Venturi effect are known in the prior art.

For example, a device has been proposed where the milk present in a hermetically sealed closed container is heated by an electric heater and is conveyed to a mixing area with compressed air.

In this case, the compressed air is generated by an air pump which always operates at full speed.

The compressed air flow has the function of pressurising the milk container to push the heated milk towards the mixing area.

A part of the compressed air flow is also drawn to emulsify the milk withdrawn from the container.

An emulsion device of this type is known for example from EP2665396.

However, in a device of this type it is not possible to control the temperature but only the degree of foam.

Another example of a pressurised jug for the preparation of cold foam is indicated in the U.S. Pat. No. 5,238,155A.

SUMMARY

The technical task of the present invention is therefore to make a device for emulsifying and/or heating milk which makes it possible to eliminate the decried technical drawbacks of the prior art.

As part of this technical task, an object of the invention is to make a device for emulsifying and/or heating milk which allows the independent adjustment of the temperature and the degree of foam of the milk-based drink.

Another object of the invention is to make a device for emulsifying and/or heating milk which allows to adjust a specific temperature of the milk-based drink.

The technical task, as well as this and other objects, according to the present invention are achieved by making a device for emulsifying and/or heating milk having an electronic controller, a milk heating means, a hermetically closed milk container, a mixer provided with a milk inlet, an air inlet and an outlet of a milk-based drink, a supply circuit for supplying milk to said milk inlet, where said milk supply circuit comprises a connection conduit between said milk container and said milk inlet, and at least one air pump connected in delivery to a pressurisation conduit of the milk container for pushing the pressurised milk towards said milk inlet, characterised in that it comprises a pressure adjustment means for adjusting the pressure of said pressurisation conduit, said pressure adjustment means being used for adjusting the temperature of the milk.

In an embodiment of the invention, the milk heating means comprises an inlet of steam into said mixer and a supply circuit for supplying steam to said steam inlet, where said steam supply circuit comprises a water pump, a boiler for producing steam from water and a conduit for supplying steam to said steam inlet, provided with a valve means for intercepting steam.

In an embodiment of the invention, said at least one air pump comprises an electric air pump, and said pressure adjustment means includes a delivery pressure sensor of said electric air pump connected to said control unit for modulating the power supply of said electric air pump.

Advantageously, the device comprises a conduit for supplying compressed air to said air inlet.

In a first embodiment of the invention, said conduit for supplying compressed air to said air inlet is in direct communication with said pressurisation conduit of the milk container and is provided with a valve means for intercepting the compressed air.

In a further embodiment of the invention, said conduit for supplying compressed air to said air inlet is separated from said pressurisation conduit of the milk container and is provided with a dedicated air pump.

In such a case, preferably the conduit for supplying compressed air to said air inlet is connected to said conduit for supplying steam to said steam inlet and said steam inlet coincides with said air inlet.

In an embodiment of the invention, the device further has a means for adjusting the temperature of the steam.

In an embodiment of the invention, the steam temperature adjustment means includes a temperature sensor of the steam boiler.

In an embodiment of the invention, the device has a milk temperature sensor which is present in the milk container.

In an embodiment of the invention, said mixer has in cascade a pre-mixing chamber including said air inlet and said steam inlet and a mixing chamber including said milk inlet.

The present invention further discloses a method for producing a milk-based drink in which said electronic controller adjusts the pressure of the pressurisation conduit for adjusting the temperature of the milk.

Said electronic controller adjusts the pressure of the pressurisation conduit by modulating the delivery pressure of said at least one air pump, or by driving the opening and closing of one or more valves with calibrated orifices possibly present along the pressurisation conduit.

The present invention finally discloses a coffee machine which incorporates such a device for emulsifying and/or heating milk.

It should be noted that the adjustment of the temperature and the degree of foam of the milk-based drink can be performed completely independently of each other by virtue of the adjustment of the operating regime of the air pumps and/or other valve devices.

For example, by using the device according to the first embodiment if, without modifying the settings of the steam circuit, only the temperature of the milk-based drink is to be varied, it is sufficient that the electronic controller intervenes only on the air pump to modify the delivery pressure thereof. If the delivery pressure of the air pump increases, the temperature of the milk-based drink decreases and vice versa if the delivery pressure of the air pump decreases, the temperature of the milk-based drink increases. Since the supply conduit which supplies compressed air to the milk container is in direct communication with the supply conduit which supplies compressed air to the air inlet of the mixer, the proportion between the air and milk flows entering the mixer does not vary and consequently the degree of foam of the milk-based drink does not vary, but only its temperature. The delivery pressure is monitored by the pressure sensor which provides feedback to the electronic controller which can intervene in the event of a deviation between the detected pressure and the set pressure. If instead, for example, without modifying the settings of the steam circuit, only the degree of foam of the milk-based drink is to be varied, the electronic controller intervenes on the air valve interception means to modify the opening time period thereof during the delivery cycle. The delivery pressure can be monitored by the pressure sensor which provides feedback to the electronic controller which can intervene in the event of a deviation between the detected pressure and the set pressure.

BRIEF DESCRIPTION OF THE DRAWINGS

Further features and advantages of the invention will more fully emerge from the description of a preferred but not exclusive embodiment of the device for emulsifying and/or heating milk according to the invention, illustrated by way of non-limiting example in the accompanying figures of the drawings, in which.

DETAILED DESCRIPTION

Equivalent parts will be indicated in the various embodiments using the same reference number.

With reference to the figures mentioned, a device for emulsifying and/or heating milk is shown, indicated overall with the reference number 1.

The device 1 comprises an electronic controller 15, a user interface panel 17 provided with controls 16 for manual selection of the temperature and the degree of foam of the milk-based drink, a means 2 for heating the milk, a hermetically closed container 3 of the milk, a mixer 4 provided with a milk inlet 5, an air inlet 6 and an outlet 7 of a milk-based drink.

The device 1 further comprises a circuit for supplying air to the air inlet 6 and a circuit for supplying milk to the milk inlet 5.

The milk supply circuit comprises a conduit 8 connecting the milk container 3 to the milk inlet 5.

The conduit 8 is immersed in the milk and extends towards the bottom of the milk container 3.

The container 3 defines an air chamber 29 above the free surface of the milk.

The device 1 further includes an air pump 9, in particular an electric pump, connected in delivery to a pressurisation conduit 10 of the milk container 3 for pushing the pressurised milk towards the milk inlet 5.

The pressurisation conduit 10 opens into the air chamber 29.

The circuit for supplying air to the air inlet 6 comprises a conduit 11 for supplying compressed air to the air inlet 6.

The milk heating means 2 comprises an inlet 18 of steam into the mixer 4 and a circuit for supplying steam to the steam inlet 18.

The steam supply circuit comprises a water pump 19, a boiler 20 for steaming water and a conduit 21 for supplying steam to the steam inlet 18.

In turn, the conduit 21 for supplying steam to the steam inlet 18 is provided with a valve means 22 for intercepting the steam, for example but not necessarily a three-way solenoid shut-off valve which also connects the conduit 21 for supplying steam to an expansion chamber 23.

Figure 1:
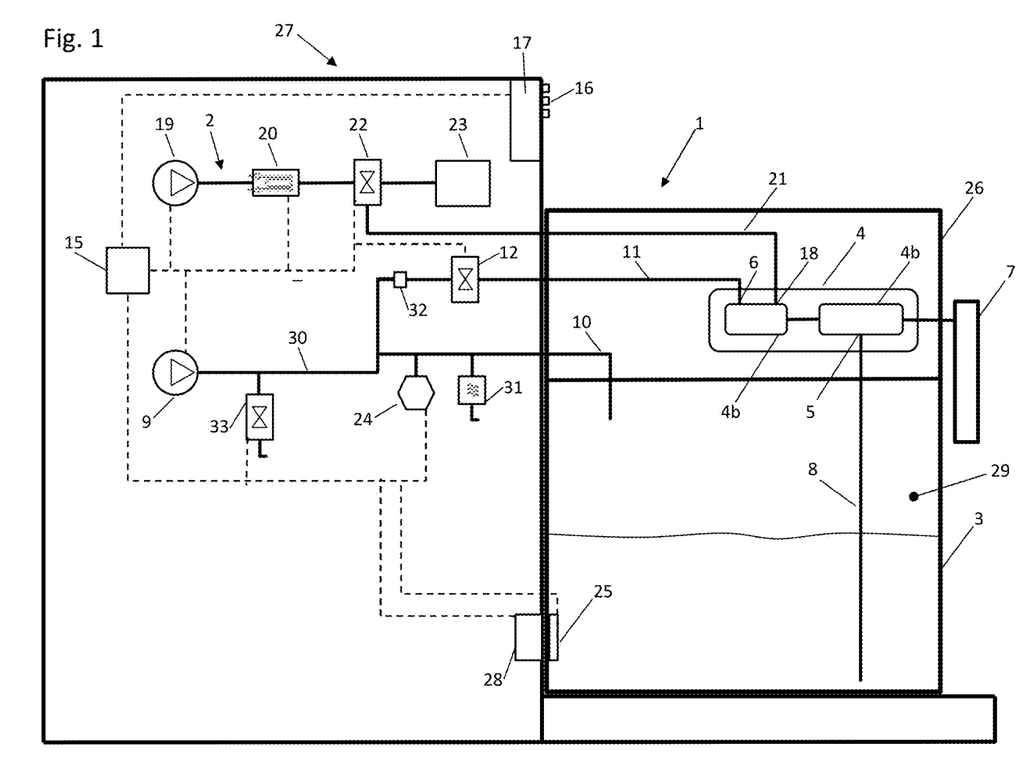
FIG. 1 schematically shows a first embodiment of the device for emulsifying and/or heating milk.
Figure 2:
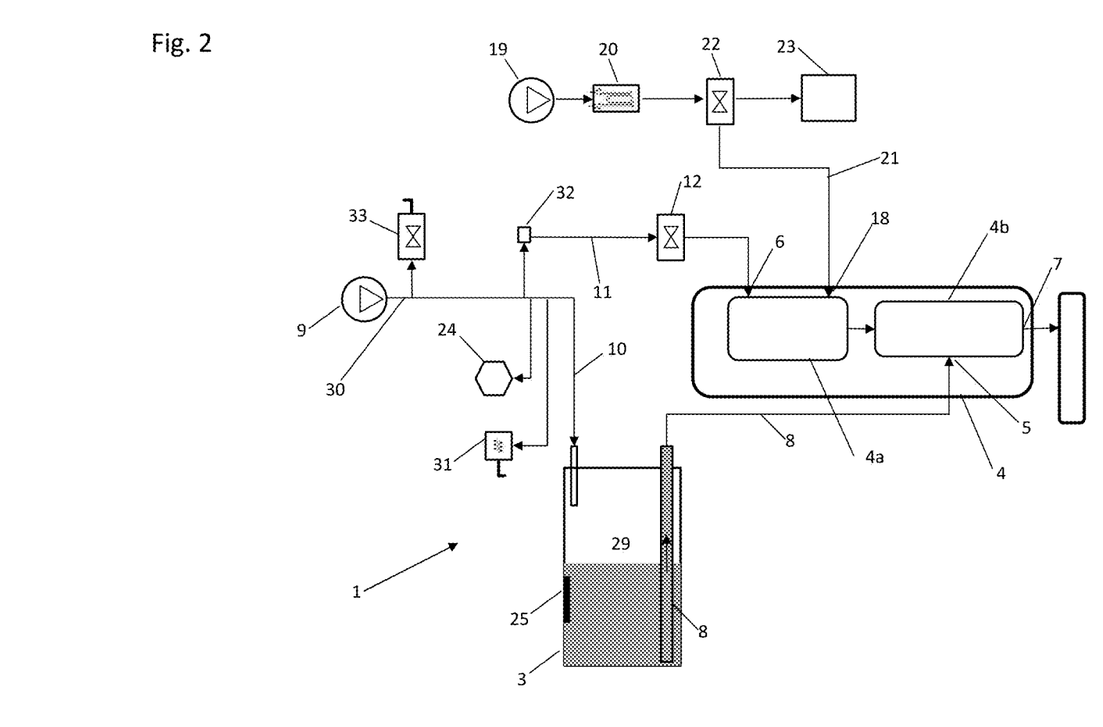
FIG. 2 shows a block diagram of the air, milk and steam circuits of the device of FIG. 1.

With reference to the solution illustrated in FIGS. 1 and 2, the conduit 11 for supplying compressed air to the air inlet 6 is in direct communication with the pressurisation conduit 10 of the milk container 3 and is provided with a calibrated orifice 32 and a valve means 12 for intercepting the compressed air. In practice, the conduit 11 for supplying compressed air to the air inlet 6 and the pressurisation conduit 10 of the milk container 3 are formed by branches of the delivery conduit 30 of the air pump 9.

A discharge valve 33 is placed along the delivery conduit 30 of the air pump 9 which is used to discharge the pressure at the end of the dispensing.

The air shut-off valve means 12 can be formed by a solenoid valve, for example but not necessarily a two-way shut-off solenoid valve.

Figure 3:
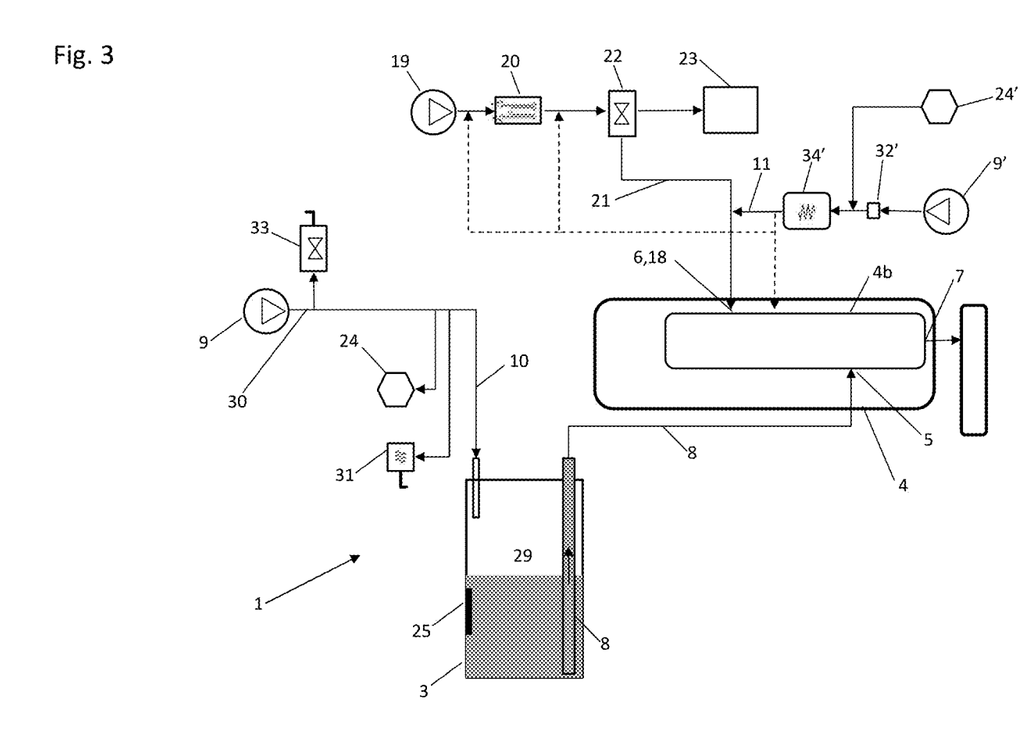
FIG. 3 shows a block diagram of an embodiment of the air, milk and steam circuit of the device for emulsifying and/or heating milk.
Figure 5:
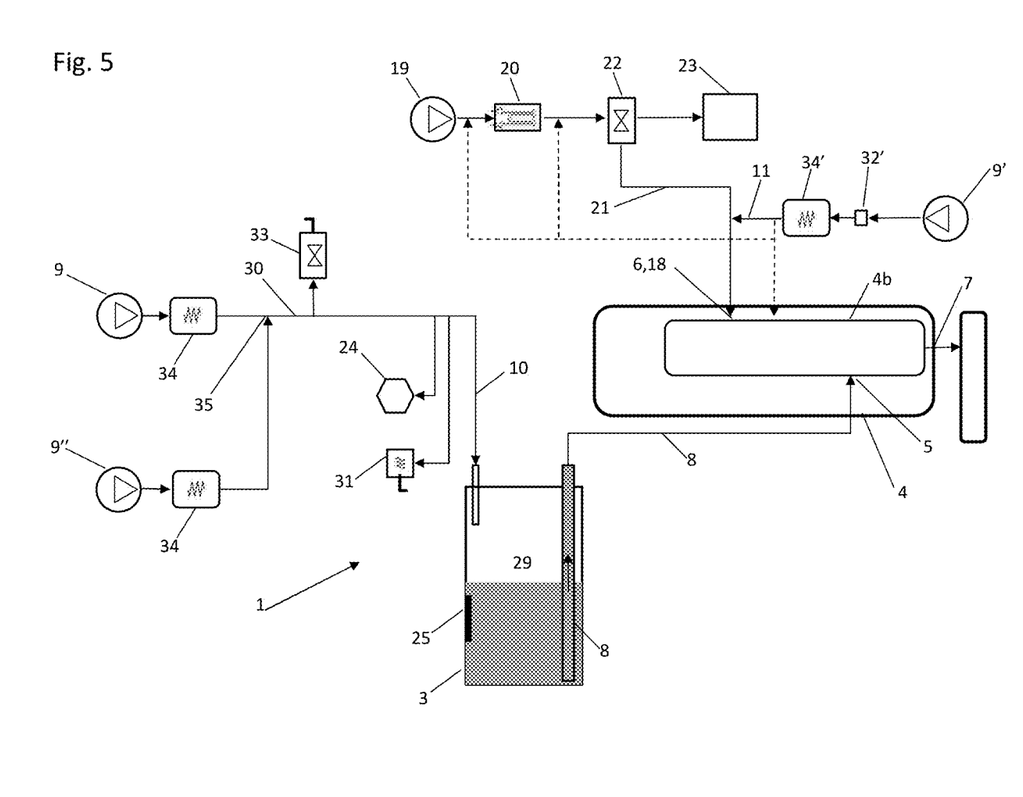
FIG. 5 shows a block diagram of a further embodiment of the air, milk and steam circuit of the device for emulsifying and/or heating milk.
Figure 6:
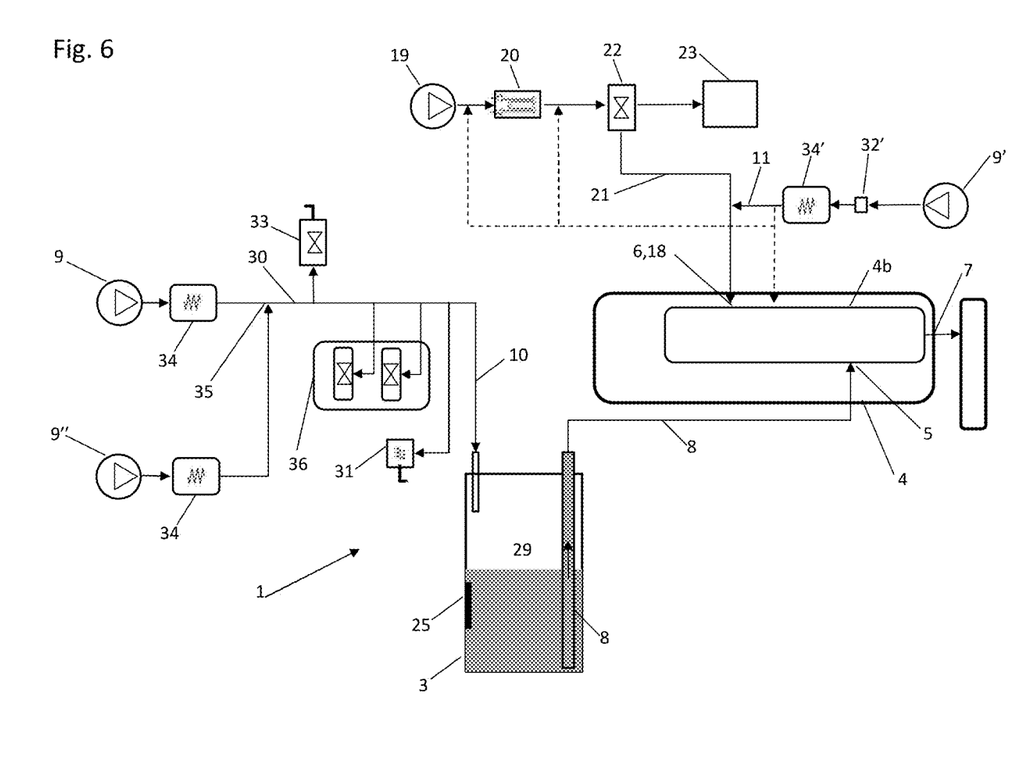
FIG. 6 shows a block diagram of a further embodiment of the air, milk and steam circuit of the device for emulsifying and/or heating milk.

With reference to the solutions illustrated in FIGS. 3, 5 and 6, the conduit 11 for supplying compressed air to the air inlet 6 is separated from the pressurisation conduit 10 and is provided with a dedicated air pump 9'.

In such a case, the conduit 11 for supplying compressed air to the air inlet 6 is preferably provided with a non-return valve 34' and a calibrated orifice 32' and is connected to the steam supply conduit 21 and the steam inlet 18 coincides with the air inlet 6.

With reference to the solution illustrated in FIG. 3, a pressure sensor 24' can be connected to the compressed air supply conduit 11, upstream of the non-return valve 34', which communicates with the control unit 15. The control unit 15 will independently modulate the air pumps 9 and 9' based on the feedback received from the pressure sensors 24 and 24' in order to obtain the temperature and the desired degree of foaming of the drink.

Advantageously, in all the solutions shown, the device 1 is provided with a suitable means for adjusting the pressure of the pressurisation conduit 10.

In the preferred case the air pump 9 is an electric pump and the pressure adjustment means includes a sensor 24 of the delivery pressure of the air pump 9 connected to the control unit 15 for modulating the power supply of the electric air pump 9.

The pressure adjustment means of the pressurisation conduit 10 can additionally include a safety valve 31.

The pressure sensor 24 and the safety valve 31 can be installed along the pressurisation conduit 10, along the delivery conduit 30 of the air pump 9 or along the conduit 11 for supplying compressed air, upstream of the calibrated orifice 32.

The device 1 includes a means for adjusting the temperature of the steam.

The steam temperature adjustment means includes a boiler temperature sensor connected to the control unit 15; the boiler temperature sensor communicates with the control unit in order to modulate the electric power supply of the boiler 20.

The device 1 advantageously includes a milk temperature sensor 25 which is present in the milk container 3; the milk temperature sensor 25 communicates with the control unit 15 in order to modulate the electric power supply of the air pump 9 and/or the pump 19 and/or the boiler 20 and/or the valve means for intercepting air 12 and/or steam 22.

The mixer 4 comprises, connected in cascade, a pre-mixing chamber 4a including the air inlet 6 and the steam inlet 18 and a mixing chamber 4b including the milk inlet 5.

The mixer 4 can be integrated in a lid 26, possibly removable, for hermetically closing the milk container 3.

The device 1 can be integrated at least in part in a coffee machine 27 in which the electronic controller 15 is preferably installed.

In practice, the coffee machine 27 can have a mechanical, electrical, WiFi, optical, pneumatic and hydraulic connection interface with the milk container 3.

The mechanical connection interface (not shown, of the known type) allows the milk container 3 to be fixed in a predetermined manner to the coffee machine 27.

The electrical connection interface 28 makes it possible to communicate all the active components installed in the milk container 3 with the electronic controller 15, i.e., all the components which require electrical energy and data for their operation.

The hydraulic connection interface makes it possible to connect the steam supply conduit 21 to the water pump 19, which is preferably installed in the coffee machine 27 together with the boiler 20 and the valve means 22 for intercepting steam.

The pneumatic connection interfaces make it possible to connect the pressurisation conduit 10 of the milk container 3 and the conduit 11 for supplying air to the mixer 4 to the air pump 9 which is preferably installed in the coffee machine 27 together with the pressure sensor 24, the safety valve 31, the calibrated orifice 32, the discharge valve 33 and the valve means 12.

Preferably but not necessarily, as shown, all the active components except for the temperature sensor 25 are installed in the coffee machine 27.

With reference to the temperature sensor 25, a solution is shown in which it is immersed in the milk container 3 and communicates by means of electrical wiring with the electronic controller 15.

Alternatively, a wireless connection of the temperature sensor to the electronic controller 15 can be included.

However, it is also possible to implement a solution with an infrared temperature sensor installed in the coffee machine 27 in a position facing the milk container 3, at a height such as to be facing a level below the free surface of the milk.

In such a case, no active component of the device 1 is installed in the milk container 3.

Or again, it is possible to include a temperature sensor installed in the coffee machine 27 and operating in contact with a metal wall of the milk container 3.

Also in such a case, no active component of the device 1 is installed in the milk container 3.

All the active components, which obviously communicate with the electronic controller 15, will thus be installed in the coffee machine 27 as well as the electronic controller 15 itself.

It is not excluded that in a solution not shown the device 1 is structurally and functionally autonomous with respect to a coffee machine.

It is also not excluded that in a solution not shown the electronic controller 15 and other active components are mounted in the milk container 3 and that, once the milk container 3 is connected to the coffee machine 27, the electronic controller 15 of the device 1 can communicate with the electronic controller of the coffee machine 27 to coordinate the operation of the device 1.

The operation of the device 1, with reference to the device 1 illustrated in FIGS. 1 and 2, is briefly as follows.

The controller 15 has a default delivery cycle set in memory, in which the electric power supply of the electric air pump 9, the pump 19 and the boiler 20, the opening time period of the means for intercepting air 12 and steam 22 have default settings corresponding to a default temperature Tref of the drink, a delivery pressure Pref of the air pump 9, and a default foam degree Gref of the drink.

The first hypothesis concerns the selection of a more or less hot milk-based drink with respect to the one obtainable from the execution of the default cycle. If the user selects a hotter beverage, the electronic controller 15 modifies the default setting of the electric power supply of the electric air pump 9 to have a delivery pressure P such that P<Pref, vice versa if the user selects a less hot beverage, the electronic controller 15 changes the default electric power supply setting of the electric air pump 9 to have a delivery pressure P such that P>Pref. The pressure sensor 24 monitors the pressure and constantly communicates the measurement to the electronic controller 15 so that it performs the adjustments of the setting of the electric power supply of the electric air pump 9 necessary to reach and modulate the pressure P. The settings of the electric power supply of the boiler 20 and the opening time period of the air shut-off means 12 remain at the default values. The variation in milk flow is accompanied by a proportional variation in air flow since the pressure P which moves the milk is the same pressure P which moves the air, with the result that the degree of foam remains unchanged at the value Gref.

The second hypothesis concerns the selection of a hot milk-based drink as much as the one obtainable from the execution of the default delivery cycle but with more or less foam. If the user selects a drink with a degree of foam G greater than the default one Gref, the electronic controller 15 will increase the opening time period of the means 12 for intercepting air with respect to the default value, conversely it will decrease it if the user selects a drink with a degree of foam G less than the default Gref until reaching zero in the case of milk without foam. The pressure sensor 24 monitors the pressure and constantly communicates the measurement to the electronic controller 15 so that it performs the adjustments of the setting of the electric power supply of the electric air pump 9 necessary to modulate the pressure Pref.

The third hypothesis concerns the selection of a more or less hot milk-based drink and with more or less foam with respect to the one obtainable from the execution of the default dispensing cycle. In this case the electronic controller 15 will modify the settings of the electric power supply of the electric air pump 9, the opening time period of the means 12 for intercepting air, and the electric power supply of the boiler 20, combining the adjustments described in the first and second hypotheses.

The most complex hypothesis is if the user wants a drink in a cup at a specific temperature, not simply a more or less hot milk-based drink with respect to the one obtainable from the default dispensing cycle.

In this case, the electronic controller 15 needs to know the temperature of the milk in the container 3 which can however be acquired by the temperature sensor 25. If the desired temperature for the drink can be reached by modifying only the operating regime of the air pump 9, the electronic controller 15 will act in such a sense as described above and will not intervene on the settings of the steam circuit, otherwise the electronic controller 15 can intervene also or only on the settings of the steam circuit; for example, if the user selects the maximum selectable temperature of the milk-based drink, the electronic controller 15 can modify the setting of the electric power supply of the boiler 20 to have full heating power and consequently the hottest possible steam.

It is not excluded that the steam circuit settings also include the amount of steam, which can be adjusted by setting the duration of the opening time of the valve means 22 for intercepting steam and/or the activation period of the pump 19.

A fine adjustment of the temperature of the drink can be obtained with a temperature sensor placed at the outlet 7 of the mixer 4 which can signal in real time to the electronic controller 15 the deviation between the output temperature of the drink and the desired temperature so that the electronic controller 15 can always make the necessary adjustments in real time, for example by modulating the electric power supply of the steam boiler 20 and/or the air pump 9.

The device shown in FIG. 3 is also capable of adjusting the quantities of air, milk and steam independently of each other. In this case, the air for foaming is injected by the additional pump 9'. The mixture of air and steam can enter the pre-mixing chamber 4a and then join the milk in the mixing chamber 4b, as shown in FIG. 2, or it can directly join the milk in the mixing chamber 4b, which would make the pre-mixing chamber 4a, as shown in FIG. 3, superfluous. The air can be injected into the steam downstream of the valve intercepting means 22, as shown, or upstream thereof between the water pump 19 and the boiler 20.

Furthermore, air, steam and milk could be injected into the mixing chamber 4b completely independently, in this case the inlets 5, 6 and 18 would all converge in said mixing chamber 4b.

If the air pump 9' is activated, the air is injected into the steam and the resulting drink is foamed, otherwise the drink is not foamed. To reach the same level of foam at various temperatures of dispensed drink, it is necessary to adjust the air dispensed by the additional pump 9': the electronic controller 15 knows the pressure in the milk container 3 by virtue of the pressure transducer 24, and consequently knows the flow of milk entering the mixer 4 and can thus adjust the additional pump 9' and consequently the amount of air dispensed. To modulate the degree of foam, the electronic controller 15 can modify the on and off times of the additional pump 9' or can modify its electric power supply, if the additional pump 9' is itself an electric pump.

The device for emulsifying and/or heating milk as conceived herein is susceptible to numerous modifications and variants, all falling within the scope of the inventive concept; further, all the details are replaceable by technically equivalent elements.

Figure 4:
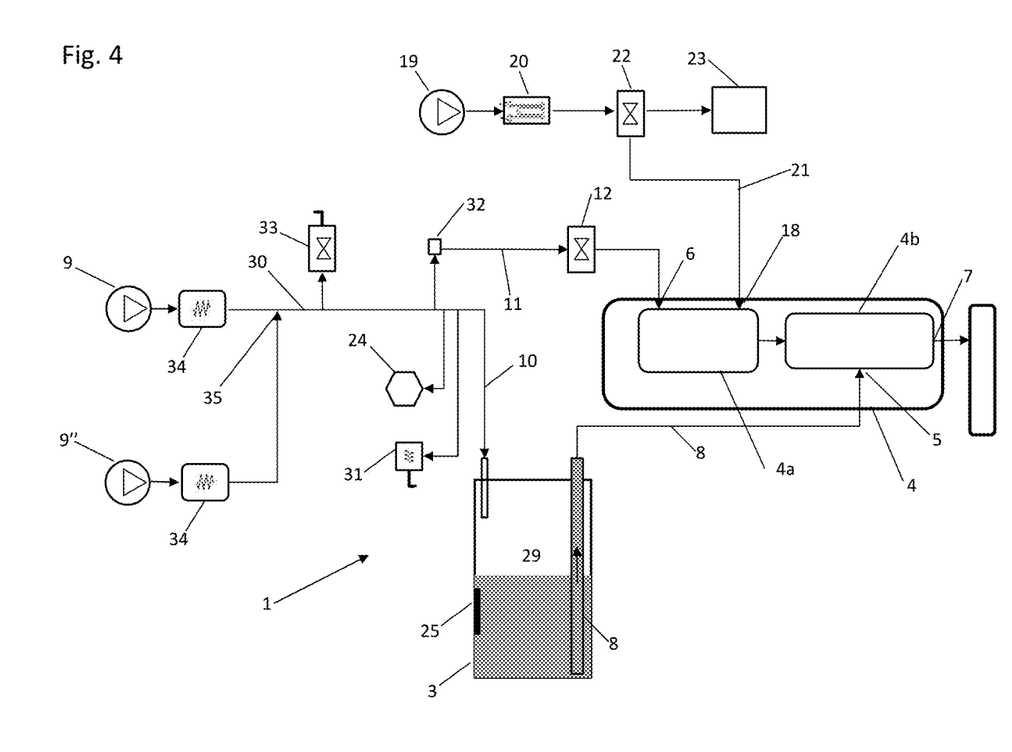
FIG. 4 shows a block diagram of a further embodiment of the air, milk and steam circuit of the device for emulsifying and/or heating milk.

For example, as shown in the embodiments of FIGS. 4, 5 and 6, more air pumps 9, 9" can be included for pressurising the milk container 3.

In particular, two air pumps 9, 9" can be included, arranged in parallel. Preferably, each air pump 9, 9" has, upstream of the junction point 35 of the respective delivery conduits, a respective non-return valve 34.

If the pumps are identical, one of the air pumps 9, 9" can be activated and modulated when the preparation of a warmer milk is requested which requires the creation of a smaller flow of milk supplied to the mixer 4, while both air pumps 9, 9" can be activated and modulated when the production of colder milk is requested which requires the creation of a greater flow of milk supplied to the mixer 4. In both cases, each of the active air pumps 9, 9" is modulated by the control unit 15 based on the feedback received from the pressure sensor 24.

It is also possible to include two different air pumps 9, 9", in particular with different nominal capacity and selectively activatable. In such a case, the two different air pumps 9, 9" can also be activated in combination, by means of a special system which prevents their mutual interference, to expand the range of performance in terms of the air flow dispensed.

With such a solution with multiple air pumps 9, 9" it is possible to implement an even finer adjustment of the temperature of the milk dispensed.

The solution illustrated in FIG. 4 coincides with that shown in FIG. 2 for the rest.

The solution illustrated in FIG. 5 differs from that illustrated in FIG. 3, as well as for the inclusion of several air pumps 9, 9", also for the fact of not including the pressure sensor 24' downstream of the air pump 9'.

In the solution illustrated in FIG. 5, the control of the air pump 9' is delegated to the control unit 15 on values preset in the control unit 15 which are chosen based on the feedback received only from the pressure sensor 24.

The solution illustrated in FIG. 6 differs from that illustrated in FIG. 5 for the fact that the pressure sensor 24 is replaced by one or more valves with calibrated orifices 36, positioned along the pressurisation conduit 30 and configured, when activated, to create a by-pass towards the outside or a controlled load loss so as to set the pressure in the pressurisation conduit 10 at predefined values.

In this configuration illustrated in FIG. 6 the air pumps 9, 9" are not modulated but managed by the control unit 15 so that in combination with the management of the valve means with calibrated orifices 36, the electronic controller 15 can ensure the achievement of an adequate pressure to obtain the temperature and degree of foaming of the desired drink.

Figure 7:
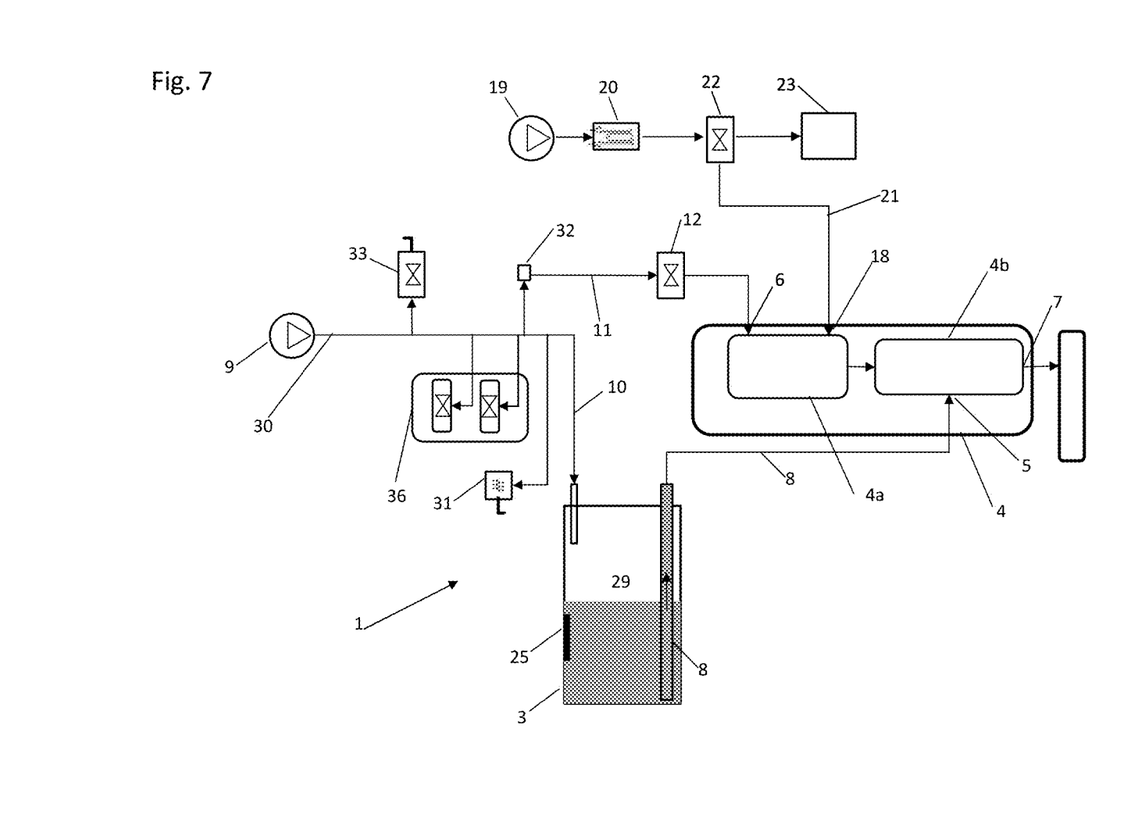
FIG. 7 shows a block diagram of a further embodiment of the air, milk and steam circuit of the device for emulsifying and/or heating milk.

The solution illustrated in FIG. 7 differs from that illustrated in FIG. 2 for the fact that the pressure sensor 24 is replaced by one or more valves with calibrated orifices 36, positioned along the pressurisation conduit 30 and configured, when activated, to create a by-pass towards the outside or a controlled load loss so as to set the pressure in the pressurisation conduit 10 at predefined values.

In practice, the materials used, as well as the dimensions, can be any according to the needs and the state of the art.

The invention claimed is:

1. A device for emulsifying and/or heating milk comprising:
   a hermetically closed milk container configured to retain a volume of milk;
   a mixer comprising a milk inlet in fluid communication with the volume of milk configured to provide milk from the milk container to the mixer;
   an air inlet in fluid communication with the mixer configured to provide air to the mixer;
   a milk heater in fluid communication with the mixer configured to provide heated fluid to the mixer;
   an outlet in fluid communication with the mixer configured to dispense a milk-based drink; and
   a supply circuit supplying milk to said milk inlet, comprising:
      a connection conduit between said milk container and said milk inlet, and
      at least one air pump connected to a pressurization conduit of the milk container configured to provide pressurized milk towards said milk inlet,
   a pressure adjustment unit adjusting the pressure of said pressurization conduit, said pressure adjustment unit being used to adjust the temperature of the milk; and
   an electronic controller operatively connected to one or more electrically controlled components of the device to adjust a pressure of the pressurization conduit,
   wherein said air pump is an electric air pump, and said pressure adjustment unit of said pressurisation conduit comprises a delivery pressure sensor of said electric air pump connected to said electronic controller.

2. The device for emulsifying and/or heating milk according to claim 1, wherein the heated fluid is steam and said milk heater comprises an inlet of steam into said mixer and a supply circuit for supplying steam to said steam inlet, wherein said steam supply circuit comprises a water pump, a boiler for producing steam from water and a conduit for supplying steam to said steam inlet, provided with a valve means for intercepting steam.

3. The device for emulsifying and/or heating milk according to claim 2, further comprising a conduit for supplying compressed air to said air inlet.

4. The device for emulsifying and/or heating milk according to claim 3, wherein said conduit for supplying compressed air to said air inlet is in direct communication with said pressurisation conduit and is provided with a calibrated orifice and with a valve intercepting the compressed air.

5. The device for emulsifying and/or heating milk according to claim 3, wherein said conduit for supplying compressed air to said air inlet is separated from said pressurisation conduit and is provided with a dedicated air pump.

6. The device for emulsifying and/or heating milk according to claim 5, wherein said conduit for supplying compressed air to said air inlet is connected to said conduit for supplying steam to said steam inlet and said steam inlet coincides with said air inlet.

7. The device for emulsifying and/or heating milk according to claim 5, wherein said conduit for supplying compressed air to said air inlet has a pressure sensor.

8. The device for emulsifying and/or heating milk according to claim 1, further comprising a milk temperature sensor which is present in the milk container.

9. The device for emulsifying and/or heating milk according to claim 1, wherein along a delivery conduit of said air pump there is a discharge valve for discharging the pressure after dispensing the milk-based drink, and in that said pressure adjustment unit of said pressurisation conduit includes a safety valve.

10. The device for emulsifying and/or heating milk according to claim 1, further comprising various air pumps pressurising said milk container.

11. A method for producing a milk-based drink with a device according to claim 1, adjusting the pressure of the pressurisation conduit for adjusting the temperature of the milk with said electronic controller.

12. The method for producing a milk-based drink according to claim 11, wherein adjusting the pressure of the pressurisation conduit comprises modulating the delivery pressure of said at least one air pump.

13. A device for emulsifying and/or heating milk comprising:
   a hermetically closed milk container configured to retain a volume of milk;
   a mixer comprising a milk inlet in fluid communication with the volume of milk configured to provide milk from the milk container to the mixer;
   an air inlet in fluid communication with the mixer configured to provide air to the mixer;
   a milk heater in fluid communication with the mixer configured to provide heated fluid to the mixer;
   an outlet in fluid communication with the mixer configured to dispense a milk-based drink; and
   a supply circuit supplying milk to said milk inlet, comprising:
      a connection conduit between said milk container and said milk inlet, and
      at least one air pump connected to a pressurization conduit of the milk container configured to provide pressurized milk towards said milk inlet,
   a pressure adjustment unit adjusting the pressure of said pressurization conduit, said pressure adjustment unit being used to adjust the temperature of the milk; and
   an electronic controller operatively connected to one or more electrically controlled components of the device to adjust a pressure of the pressurization conduit,
   wherein in that said pressure adjustment unit of said pressurization conduit comprises one or more valves with calibrated orifices, positioned along said pressurization conduit and configured, when activated, to create a by-pass towards an outside or a controlled load loss so as to set the pressure in said pressurization conduit at predefined values.

14. A method for producing a milk-based drink with a device according to claim 13, adjusting the pressure of the pressurisation conduit for adjusting the temperature of the milk with said electronic controller.

15. The method for producing a milk-based drink with a device according to claim 14, adjusting the pressure of the pressurisation conduit comprises driving the opening and closing of one or more valves with calibrated orifices provided along said pressurisation conduit.

16. A device for emulsifying and/or heating milk comprising:

a hermetically closed milk container configured to retain a volume of milk;

a mixer comprising a milk inlet in fluid communication with the volume of milk configured to provide milk from the milk container to the mixer;

an air inlet in fluid communication with the mixer configured to provide air to the mixer;

a milk heater in fluid communication with the mixer configured to provide heated fluid to the mixer;

an outlet in fluid communication with the mixer configured to dispense a milk-based drink; and a supply circuit supplying milk to said milk inlet, comprising:
- a connection conduit between said milk container and said milk inlet, and
- at least one air pump connected to a pressurization conduit of the milk container for configured to provide pressurized milk towards said milk inlet, a pressure adjustment unit adjusting the pressure of said pressurization conduit, said pressure adjustment unit being used to adjust the temperature of the milk; and an electronic controller operatively connected to one or more electrically controlled components of the device to adjust a pressure of the pressurization conduit, wherein along a delivery conduit of said air pump there is a discharge valve for discharging the pressure after dispensing the milk-based drink, and in that said pressure adjustment unit of said pressurisation conduit includes a safety valve.

* * * * *